US010148323B2

(12) United States Patent
Chen et al.

(10) Patent No.: US 10,148,323 B2
(45) Date of Patent: Dec. 4, 2018

(54) UPLINK INTER-CELL COORDINATION METHOD AND BASE STATION

(71) Applicant: Huawei Technologies Co., Ltd., Shenzhen, Guangdong (CN)

(72) Inventors: Tuo Chen, Shanghai (CN); Qunfang Lou, Shanghai (CN); Xiaojie Shao, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 81 days.

(21) Appl. No.: 15/494,129

(22) Filed: Apr. 21, 2017

(65) Prior Publication Data

US 2017/0230086 A1 Aug. 10, 2017

Related U.S. Application Data

(63) Continuation of application No. PCT/CN2015/078976, filed on May 14, 2015.

(30) Foreign Application Priority Data

Oct. 24, 2014 (CN) .......................... 2014 1 0577216

(51) Int. Cl.
*H04B 7/024* (2017.01)
*H04W 72/12* (2009.01)
(Continued)

(52) U.S. Cl.
CPC ............ *H04B 7/024* (2013.01); *H04W 28/04* (2013.01); *H04W 72/042* (2013.01); *H04W 72/0446* (2013.01); *H04W 72/1278* (2013.01)

(58) Field of Classification Search
None
See application file for complete search history.

(56) References Cited

U.S. PATENT DOCUMENTS 9,066,249 B2 * 6/2015 Mir Ghaderi ......... H04W 24/02
2006/0227789 A1 * 10/2006 Dottling ................ H04L 1/0083
370/395.21
(Continued)

FOREIGN PATENT DOCUMENTS

CN 101640901 A 2/2010
CN 101841399 A 9/2010
(Continued)

OTHER PUBLICATIONS

Huawei, "RAN2 considerations for coordinated multipoint transmission and reception," R2-093107, 3GPP TSG-RAN WG2 meeting #66, San Francisco, USA, May 4-8, 2009, 5 pages.
(Continued)

*Primary Examiner* — Bunjob Jaroenchonwanit (57) ABSTRACT

Embodiments of the present invention provide an uplink inter-cell coordination method. The method include: determining, by a first base station, whether first uplink data sent by user equipment UE and forwarded by a second base station is received before a first moment; if the first base station determines that the first uplink data is not received before the first moment, performing, by the first base station, demodulation and decoding of second uplink data received from the UE, and if an incorrect demodulation and decoding result is obtained, suspending, by the first base station, an HARQ process and determining whether the first uplink data forwarded by the second base station is received between the first moment and a second moment, where the second moment is later than the first moment.

12 Claims, 6 Drawing Sheets

(51) Int. Cl.
*H04W 28/04* (2009.01)
*H04W 72/04* (2009.01)

(56) References Cited

U.S. PATENT DOCUMENTS

| | | | |
|---|---|---|---|
| 2008/0151831 A1* | 6/2008 | Khan | H04L 1/0656 370/330 |
| 2009/0319855 A1* | 12/2009 | Yue | H04L 1/0003 714/751 |
| 2010/0061287 A1* | 3/2010 | Josiam | H03M 13/6306 370/312 |
| 2010/0251054 A1* | 9/2010 | Cai | H04L 1/1877 714/748 |
| 2012/0014315 A1 | 1/2012 | Yang et al. | |
| 2012/0093073 A1* | 4/2012 | Lunttila | H04L 1/1607 370/328 |
| 2012/0120927 A1* | 5/2012 | Bucknell | H04B 7/022 370/336 |
| 2012/0147815 A1* | 6/2012 | Meyer | H04B 7/022 370/328 |
| 2014/0286269 A1* | 9/2014 | Stanwood | H04W 24/02 370/329 |
| 2014/0293889 A1* | 10/2014 | Mahr | H04L 1/1825 370/329 |
| 2014/0348143 A1* | 11/2014 | Kato | H04W 52/0206 370/336 |
| 2015/0016390 A1* | 1/2015 | McBeath | H04L 1/1822 370/329 |
| 2017/0012760 A1* | 1/2017 | Feuersaenger | H04L 5/001 |

FOREIGN PATENT DOCUMENTS

| | | |
|---|---|---|
| CN | 101873631 A | 10/2010 |
| CN | 101924609 A | 12/2010 |
| CN | 101931514 A | 12/2010 |
| CN | 102428669 A | 4/2012 |
| CN | 102474392 A | 5/2012 |
| CN | 102498688 A | 6/2012 |
| WO | 2012097656 A1 | 7/2012 |

OTHER PUBLICATIONS

Alcatel-Lucent Shanghai Bell, et al., "Discussion on CoMP related RAN2 issues," R2-095848, TSG-RAN WG2#67bis, Miyazaki, Japan, Oct. 12-16, 2009, 3 pages.

* cited by examiner

UPLINK INTER-CELL COORDINATION METHOD AND BASE STATION

CROSS-REFERENCE TO RELATED APPLICATIONS

This application is a continuation of International Application No. PCT/CN2015/078976, filed on May 14, 2015, which claims priority to Chinese Patent Application No. 201410577216.4, filed on Oct. 24, 2014. The disclosures of the aforementioned applications are hereby incorporated by reference in their entireties.

TECHNICAL FIELD

The present invention relates to the field of communications technologies, and in particular, to an uplink inter-cell coordination method and a base station.

BACKGROUND

In an uplink coordinated multipoint transmission (CoMP) technology, multiple sectors within a base station or multiple base stations perform joint reception, demodulation, and decoding of uplink data of user equipment (UE), so as to improve coverage performance for edge UE and improve an uplink rate of the UE. For example, a serving cell of UE belongs to a base station 0, coordinated cells belong to base stations 1 to K (K≥1), and the base station 0 and the base stations 1 to K perform joint reception, demodulation, and decoding of uplink data sent by the UE. According to this manner, after completing MAC layer scheduling, the base station 0 sends management information (such as scheduling information about connected UE) to the base stations 1 to K. Afterwards, the UE sends same uplink data to the base station 0 and the base stations 1 to K at the same time. The base stations 1 to K forward the received uplink data to the base station 0. The base station 0 completes joint reception, demodulation, and decoding of the data in a specified time T and performs retransmission scheduling or transmission scheduling according to a result of the joint demodulation and decoding.

In the foregoing process, the base station 0 sets a moment 1 in the specified time T. If the base station 0 receives the uplink data forwarded by the base stations 1 to K before the moment 1, the base station 0 combines the uplink data received by the base station 0 directly from the UE and the uplink data forwarded by the base stations 1 to K, and then performs joint demodulation and decoding. Joint reception, demodulation, and decoding need to be completed in a specified time. Factors such as network congestion and limited network capacity may cause a relatively long delay in data interaction between the base stations. Consequently, the uplink data forwarded by the base stations 1 to K cannot reach the base station 0 in time before the moment 1, and the base station 0 does not have enough time to perform joint demodulation and decoding. In this case, the base station 0 performs demodulation and decoding of the uplink data received directly from the UE.

However, because a correctness rate of a result of separate demodulation and decoding is lower than a correctness rate of a result of joint demodulation and decoding, a data retransmission rate of the UE is high, that is, a volume of uplink data that is successfully transmitted by the UE in unit time is reduced. Consequently, an uplink rate of the UE is reduced.

SUMMARY

Embodiments of the present invention provide an uplink inter-cell coordination method and a base station, to resolve a problem that an uplink rate of UE is low because joint reception, demodulation, and decoding cannot be performed due to a relatively long delay in interaction between base stations.

To achieve the foregoing objective, the embodiments of the present invention use the following technical solutions:

According to a first aspect, a base station is provided, including:

a first determining unit, configured to determine whether first uplink data sent by user equipment UE and forwarded by a second base station is received before a first moment, where a serving cell of the UE belongs to the first base station, and a coordinated cell of the UE belongs to the second base station;

a processing unit, configured to: perform demodulation and decoding of second uplink data received from the UE if the first determining unit determines that the first uplink data is not received before the first moment; and suspend a hybrid automatic repeat request HARQ process if an incorrect demodulation and decoding result is obtained;

a second determining unit, configured to determine whether the first uplink data forwarded by the second base station is received between the first moment and a second moment; and a demodulation and decoding unit, configured to: if the second determining unit determines that the first uplink data is received between the first moment and the second moment, where the second moment is later than the first moment, perform joint demodulation and decoding of the first uplink data and the second uplink data and determine a demodulation and decoding result, or determine a demodulation and decoding result according to first data forwarded by the second base station, where the first data is data obtained after the second base station performs demodulation and decoding of the first uplink data.

With reference to the first aspect, in a first possible implementation manner of the first aspect, the base station further includes:

an obtaining unit, configured to obtain transmission quality when the UE sends uplink data, where the uplink data includes the first uplink data and the second uplink data, and the transmission quality includes a signal-to-noise ratio SNR, a signal to interference plus noise ratio SINR, or a modulation and coding scheme MCS of the UE; and a first sending unit, configured to send an indication signal to the UE according to the transmission quality obtained by the obtaining unit, where the indication signal is used to instruct the UE to enter a transmission time interval bundling TTI Bundling state to send the uplink data.

With reference to the first aspect or the first possible implementation manner of the first aspect, in a second possible implementation manner of the first aspect, the processing unit is configured to:

send an acknowledgement signal ACK to the UE and skip sending transmission indication information of the HARQ process to the UE, where the transmission indication information is used to instruct the UE to continue to send a next piece of uplink data.

With reference to the first aspect or the first or the second possible implementation manner of the first aspect, in a third possible implementation manner of the first aspect, the demodulation and decoding unit is configured to:

perform joint demodulation and decoding of the second uplink data received from the UE and the first uplink data forwarded by the second base station; and determine that the demodulation and decoding result is correct if the demodulation and decoding is correct; or determine that the demodulation and decoding result is incorrect if the demodulation and decoding is incorrect.

With reference to the first aspect or the first or the second possible implementation manner of the first aspect, in a fourth possible implementation manner of the first aspect, the first data includes a data bit and result indication information that are obtained after the second base station performs demodulation and decoding of the first uplink data; and the demodulation and decoding unit is configured to:

determine that the demodulation and decoding result is correct, if the demodulation and decoding of the first uplink data performed by the second base station is correct and the result indication information indicates that the demodulation and decoding is correct; or determine that the demodulation and decoding result is incorrect, if the demodulation and decoding of the first uplink data performed by the second base station is incorrect and the result indication information indicates that the demodulation and decoding is incorrect.

With reference to any one of the first aspect or the first to the fourth possible implementation manners of the first aspect, in a fifth possible implementation manner of the first aspect, the base station further includes:

a second sending unit, configured to: send retransmission indication information to the UE if the first base station determines, after the second moment, that the demodulation and decoding result is incorrect, where the retransmission indication information is used to instruct the UE to retransmit the uplink data; or send the transmission indication information to the UE if the first base station determines, after the second moment, that the demodulation and decoding result is correct.

According to a second aspect, an uplink inter-cell coordination method is provided, including:

determining, by a first base station, whether first uplink data sent by user equipment UE and forwarded by a second base station is received before a first moment, where a serving cell of the UE belongs to the first base station, and a coordinated cell of the UE belongs to the second base station;

performing, by the first base station, demodulation and decoding of second uplink data received from the UE if the first base station determines that the first uplink data is not received before the first moment, and suspending, by the first base station, a hybrid automatic repeat request HARQ process if an incorrect demodulation and decoding result is obtained, and determining whether the first uplink data forwarded by the second base station is received between the first moment and a second moment; and if the first uplink data is received between the first moment and the second moment, where the second moment is later than the first moment, performing, by the first base station, joint demodulation and decoding of the first uplink data and the second uplink data and determining a demodulation and decoding result, or determining, by the first base station, a demodulation and decoding result according to first data forwarded by the second base station, where the first data is data obtained after the second base station performs demodulation and decoding of the first uplink data.

With reference to the second aspect, in a first possible implementation manner of the second aspect, the method further includes:

obtaining, by the first base station, transmission quality when the UE sends uplink data, where the uplink data includes the first uplink data and the second uplink data, and the transmission quality includes a signal-to-noise ratio SNR, a signal to interference plus noise ratio SINR, or a modulation and coding scheme MCS of the UE; and sending, by the first base station, an indication signal to the UE according to the transmission quality, where the indication signal is used to instruct the UE to enter a transmission time interval bundling TTI Bundling state to send the uplink data.

With reference to the second aspect or the first possible implementation manner of the second aspect, in a second possible implementation manner of the second aspect, the suspending, by the first base station, a hybrid automatic repeat request HARQ process includes:

sending, by the first base station, an acknowledgement signal ACK to the UE and skipping sending transmission indication information of the HARQ process to the UE, where the transmission indication information is used to instruct the UE to continue to send a next piece of uplink data.

With reference to the second aspect or the first or the second possible implementation manner of the second aspect, in a third possible implementation manner of the second aspect, the performing, by the first base station, joint demodulation and decoding of the first uplink data and the second uplink data and determining a demodulation and decoding result includes:

performing, by the first base station, joint demodulation and decoding of the second uplink data received from the UE and the first uplink data forwarded by the second base station; and determining, by the first base station, that the demodulation and decoding result is correct if the demodulation and decoding is correct; or determining, by the first base station, that the demodulation and decoding result is incorrect if the demodulation and decoding is incorrect.

With reference to the second aspect or the first or the second possible implementation manner of the second aspect, in a fourth possible implementation manner of the second aspect, the first data includes a data bit and result indication information that are obtained after the second base station performs demodulation and decoding of the first uplink data; and the determining, by the first base station, a demodulation and decoding result according to first data forwarded by the second base station includes:

determining, by the first base station, that the demodulation and decoding result is correct, if the demodulation and decoding of the first uplink data performed by the second base station is correct and the result indication information indicates that the demodulation and decoding is correct; or determining, by the first base station, that the demodulation and decoding result is incorrect, if the demodulation and decoding of the first uplink data performed by the second base station is incorrect and the result indication information indicates that the demodulation and decoding is incorrect.

With reference to any one of the second aspect or the first to the fourth possible implementation manners of the second aspect, in a fifth possible implementation manner of the second aspect, the method further includes:

sending, by the first base station, retransmission indication information to the UE if the first base station determines, after the second moment, that the demodulation and decoding result is incorrect, where the retransmission indication information is used to instruct the UE to retransmit the uplink data; or sending, by the first base station, the transmission indication information to the UE if the first base station determines, after the second moment, that the demodulation and decoding result is correct.

According to the uplink inter-cell coordination method and the base station that are provided in the embodiments of the present invention, a serving cell of UE belongs to a first base station, and a coordinated cell belongs to a second base station. When the first base station does not receive, before a first moment, first uplink data forwarded by the second base station, and the first base station performs demodulation and decoding of second uplink data received from the UE and obtains an incorrect demodulation and decoding result, the first base station suspends a hybrid automatic repeat request HARQ process. In this case, different from the prior art in which retransmission scheduling is immediately performed, the first base station waits to receive the first uplink data forwarded by the second base station until a second moment. Therefore, a moment for joint reception, demodulation, and decoding is postponed to the second moment in this embodiment of the present invention from the first moment in the prior art, so that when the first uplink data forwarded by the second base station does not reach the first base station in time before the first moment due to a relatively long delay in data interaction between the base stations, the first base station has more time to perform joint reception, demodulation, and decoding. Because a correctness rate of joint reception, demodulation, and decoding is higher than a correctness rate of separate demodulation and decoding by the first base station, a volume of uplink data that is successfully transmitted by the UE in unit time is increased, thereby improving an uplink rate of the UE, and resolving a problem that an uplink rate of UE is low because joint reception, demodulation, and decoding cannot be performed due to a relatively long delay in data interaction between base stations.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An uplink inter-cell coordination method provided in an embodiment of the present invention may be applied to various communications systems, for example, 2G and 3G communications systems, and next generation communications systems, such as a Global System for Mobile Communications (Global System for Mobile Communications, GSM), a time division multiple access (Time Division Multiple Access, TDMA) system, a code division multiple access (Code Division Multiple Access, CDMA) system, a general packet radio service (General Packet Radio Service, GPRS) system, a Long Term Evolution (Long Term Evolution, LTE) system, and other such communications systems.

Descriptions are made in the present application with reference to UE and a base station.

The UE may be a wireless device or a wired device. For example, the UE may refer to a device that provides a user with voice and/or data connectivity, a handheld device with a radio connection function, or another processing device connected to a radio modem.

The base station (for example, an access point) may refer to a device in communication with a wireless terminal via one or more sectors at an air interface in an access network. For example, the base station may be a base station (BTS, Base Transceiver Station) in the GSM or CDMA, may be a base station (NodeB) in the WCDMA, or may be an evolved NodeB (evolved Node B, NodeB or eNB or e-NodeB) in the LTE, which is not limited in the present invention.

Figure 1:
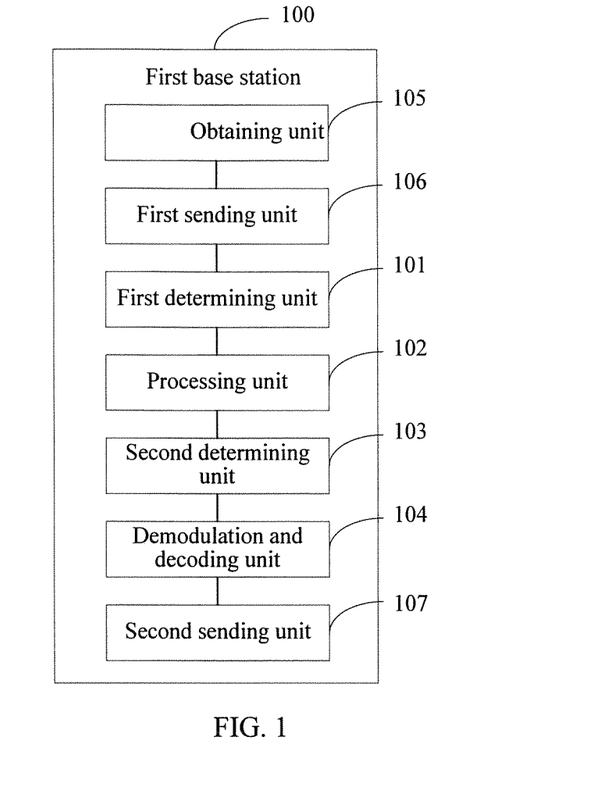
FIG. 1 is a structural diagram of a base station according to an embodiment of the present invention.

Referring to FIG. 1, an embodiment of the present invention provides a first base station 100, a serving cell of UE belongs to the first base station, and the first base station may include the following parts: a first determining unit 101, a processing unit 102, a second determining unit 103, and a demodulation and decoding unit 104.

The first determining unit 101 is configured to determine whether first uplink data sent by user equipment UE and forwarded by a second base station is received before a first moment, where a serving cell of the UE belongs to the first base station, and a coordinated cell of the UE belongs to the second base station.

The serving cell of the UE refers to a primary serving cell that provides the UE with various communications services such as voice and data, and the coordinated cell is a neighboring cell of the primary serving cell of the UE and is used to exchange uplink data received from the UE with the primary serving cell, so as to implement joint data reception of multiple base stations. Herein, the UE sends same uplink data to the first base station 100 and a second base station at the same time so as to improve an uplink rate of the UE, where there may be one or more second base stations.

The processing unit 102 is configured to: perform demodulation and decoding of second uplink data received from the UE if the first determining unit 101 determines that the first uplink data is not received before the first moment; and suspend a hybrid automatic repeat request (Hybrid Automatic Repeat Request, HARQ) process if an incorrect demodulation and decoding result is obtained.

Demodulation and decoding is a process in which a base station performs, after receiving uplink data of the UE, a series of processing operations such as down-conversion, descrambling, and decoding on the uplink data to recover original useful data information.

The hybrid automatic repeat request HARQ process is used to immediately perform retransmission scheduling when an incorrect demodulation and decoding result is obtained. If the process is suspended, immediate retransmission scheduling is prohibited. In this case, the UE remains in a current state and does not send uplink data, and the UE does not perform data retransmission or transmission until the first base station 100 sends uplink grant (UpLink Grant, UL-Grant) indication information to the UE.

Optionally, the processing unit 102 may be configured to: send an acknowledgement signal (Acknowledgement, ACK) to the UE and skip sending transmission indication information of the HARQ process to the UE, so as to suspend the automatic repeat request HARQ process. The transmission indication information is used to instruct the UE to continue to send a next piece of uplink data.

The second determining unit 103 is configured to determine whether the first uplink data forwarded by the second base station is received between the first moment and a second moment.

The demodulation and decoding unit 104 is configured to: if the second determining unit 103 determines that the first uplink data is received between the first moment and the second moment, where the second moment is later than the first moment, perform joint demodulation and decoding of the first uplink data and the second uplink data and determine a demodulation and decoding result, or determine a demodulation and decoding result according to first data forwarded by the second base station, where the first data is data obtained after the second base station performs demodulation and decoding of the first uplink data.

If the first uplink data forwarded by one second base station (or more than one second base station) is received between the first moment and the second moment, the demodulation and decoding unit 104 is configured to: perform joint demodulation and decoding of the second uplink data received from the UE and the first uplink data forwarded by the second base station and determine a demodulation and decoding result.

Optionally, the demodulation and decoding unit 104 may be configured to: perform joint demodulation and decoding of the second uplink data received from the UE and the first uplink data forwarded by the second base station; and determine that the demodulation and decoding result is correct if the demodulation and decoding is correct; or determine that the demodulation and decoding result is incorrect if the demodulation and decoding is incorrect.

Optionally, the first data may include a data bit and result indication information that are obtained after the second base station performs demodulation and decoding of the first uplink data; and the demodulation and decoding unit 104 may be configured to:

determine that the demodulation and decoding result is correct, if the demodulation and decoding of the first uplink data performed by the second base station is correct and the result indication information indicates that the demodulation and decoding is correct; or determine that the demodulation and decoding result is incorrect, if the demodulation and decoding of the first uplink data performed by the second base station is incorrect and the result indication information indicates that the demodulation and decoding is incorrect.

There may be various manners in which the demodulation and decoding unit 104 is configured to determine whether the demodulation and decoding result is correct. For example, the demodulation and decoding unit 104 may compare a check code obtained after demodulation and decoding of uplink data of the UE with a check code carried in the uplink data of the UE. If the check code obtained after demodulation and decoding of the uplink data of the UE is the same as the check code carried in the uplink data of the UE, a flag bit may be set to 1, to indicate that the demodulation and decoding result is correct. If the check code obtained after demodulation and decoding of the uplink data of the UE is different from the check code carried in the uplink data of the UE, the flag bit may be set to 0, to indicate that the demodulation and decoding result is incorrect.

Optionally, the first base station may further include an obtaining unit 105 configured to obtain transmission quality when the UE sends uplink data. The uplink data includes first uplink data and second uplink data. The transmission quality may include a signal-to-noise ratio (SNR), a signal to interference plus noise ratio (SINR), or a modulation and coding scheme (MCS) of the UE and may further include other parameters, and is not limited herein.

Optionally, the first base station may further include a first sending unit 106 configured to send an indication signal to the UE according to the transmission quality obtained by the obtaining unit 105, where the indication signal is used to instruct the UE to enter a transmission time interval bundling TTI Bundling state to send the uplink data, and the first base station 100 and the second base station receive uplink data that is sent by the UE in the TTI Bundling state.

Exemplarily, when a voice service is transmitted between the UE and the base station, and the SNR or the signal to interference plus noise ratio SINR of the UE is less than a particular threshold, it indicates that great noise is mixed in a voice signal and sound quality of sound playback is low. In this case, the first sending unit 106 may be used to instruct the UE to send uplink data in the transmission time interval bundling TTI Bundling) state, so as to increase a volume of uplink data successfully transmitted by the UE. The MCS may indicate a data transmission rate of the UE in a current modulation, demodulation, and decoding manner. Therefore, when the transmission rate is lower than a particular threshold, the first sending unit 106 may be used to send an indication signal to the UE, to instruct the UE to enter the TTI Bundling state to send the uplink data.

Optionally, the first base station may further include a second sending unit 107 configured to: send retransmission indication information to the UE if the first base station 100 determines, after the second moment, that the demodulation and decoding result is incorrect, where the retransmission indication information is used to instruct the UE to retransmit the uplink data; or send the transmission indication information to the UE if the first base station 100 determines, after the second moment, that the demodulation and decoding result is correct.

According to the base station provided in this embodiment of the present invention, a serving cell of UE belongs to a first base station 100, and a coordinated cell belongs to a second base station. When the first base station 100 does not receive, before a first moment, first uplink data forwarded by the second base station, and the first base station 100 performs demodulation and decoding of second uplink data received from the UE and obtains an incorrect demodulation and decoding result, the first base station 100 suspends a hybrid automatic repeat request HARQ process. In this case, different from the prior art in which retransmission scheduling is immediately performed, the first base station 100 waits to receive the first uplink data forwarded by the second base station until a second moment. Therefore, a moment for joint reception, demodulation, and decoding is postponed to the second moment in this embodiment of the present invention from the first moment in the prior art, so that when the first uplink data forwarded by the second base station does not reach the first base station 100 in time before the first moment due to a relatively long delay in data interaction between the base stations, the first base station 100 has more time to perform joint reception, demodulation, and decoding. Because a correctness rate of joint reception, demodulation, and decoding is higher than a correctness rate of separate demodulation and decoding by the first base station 100, a volume of uplink data that is successfully transmitted by the UE in unit time is increased, thereby improving an uplink rate of the UE, and resolving a problem that an uplink rate of UE is low because joint reception, demodulation, and decoding cannot be performed due to a relatively long delay in data interaction between base stations.

Figure 2:
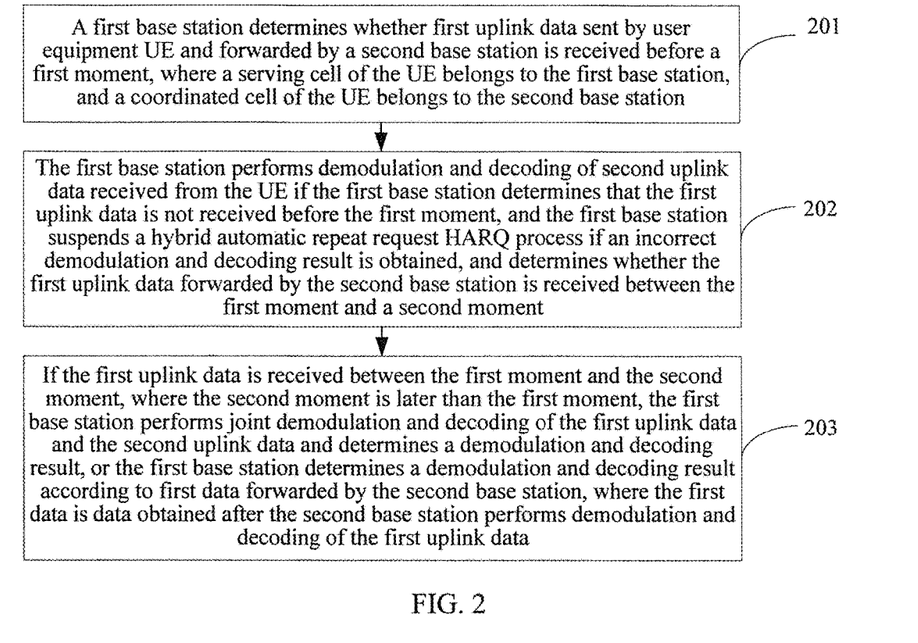
FIG. 2 is a flowchart of an uplink inter-cell coordination method according to an embodiment of the present invention.

An embodiment of the present invention provides an uplink inter-cell coordination method. As shown in FIG. 2, the method may include the following steps:

201: A first base station determines whether first uplink data sent by user equipment UE and forwarded by a second base station is received before a first moment, where a serving cell of the UE belongs to the first base station, and a coordinated cell of the UE belongs to the second base station.

The serving cell of the UE refers to a primary serving cell that provides the UE with various communications services such as voice and data, and the coordinated cell is a neighboring cell of the primary serving cell of the UE and is used to exchange uplink data received from the UE with the primary serving cell, so as to implement joint data reception of multiple base stations. Herein, the UE sends same uplink data to the first base station and a second base station at the same time so as to improve an uplink rate of the UE, where there may be one or more second base stations.

202: The first base station performs demodulation and decoding of second uplink data received from the UE if the first base station determines that the first uplink data is not received before the first moment, and the first base station suspends a hybrid automatic repeat request HARQ process if an incorrect demodulation and decoding result is obtained, and determines whether the first uplink data forwarded by the second base station is received between the first moment and a second moment.

Demodulation and decoding is a process in which a base station performs, after receiving uplink data of the UE, a series of processing operations such as down-conversion, descrambling, and decoding on the uplink data to recover original useful data information.

The hybrid automatic repeat request HARQ process is used to immediately perform retransmission scheduling when an incorrect demodulation and decoding result is obtained. If the process is suspended, immediate retransmission scheduling is prohibited. In this case, the UE remains in a current state and does not send uplink data, and the UE does not perform data retransmission or transmission until the first base station sends UL-Grant indication information to the UE.

When the first base station does not receive, before the first moment, the first uplink data sent by the UE and forwarded by the second base station, the first base station performs separate demodulation and decoding of the second uplink data received from the UE. If a correct demodulation and decoding result is obtained after the demodulation and decoding, the first base station sends an acknowledgement signal ACK and UL-Grant indication signal to the UE, to instruct the UE to continue to send a next piece of data. Because the first base station may currently need to schedule multiple UEs, and current UE needs to wait to be scheduled by the first base station according to an order, the first base station may immediately send the UL-Grant indication information after sending the acknowledgement signal ACK to the current UE, or the first base station may send the UL-Grant indication information after a period of time after sending the acknowledgement signal ACK to the current UE. If an incorrect demodulation and decoding result is obtained after the separate demodulation and decoding, the first base station does not send a negative acknowledgement (Negative Acknowledgement, NACK) signal, that is, does not trigger the UE to perform data retransmission, but instead, still sends the ACK signal to the UE to notify UE that the first base station has received the uplink data sent by the UE, that is, the first base station suspends the automatic repeat request HARQ process and prohibits the UE from immediately performing data retransmission. For the UE, when the first base station sends the ACK and does not send the UL-Grant indication information of the HARQ process to the UE to instruct the UE to send new data, the UE cannot receive the UL-Grant indication information sent by the first base station, and therefore does not perform data transmission. That is, the UE is caused not to perform data retransmission and not to perform data transmission.

If the first base station performs separate demodulation and decoding of the second uplink data received from the UE and obtains an incorrect demodulation and decoding result, in the prior art, the first base station sends a negative acknowledgement signal NACK and UL-Grant indication information to the UE to perform retransmission scheduling, or the first base station does not send any information to the UE. In this way, it is determined that a channel detection result of a physical hybrid automatic repeat request indicator channel (Physical Hybrid ARQ Indicator Channel, PHICH) of the UE is the NACK, so that the UE initiates non-adaptive retransmission to perform data retransmission. In this embodiment of the present invention, the first base station suspends the automatic repeat request HARQ process. In this case, the UE remains in a current state and does not send uplink data, and the first base station prolongs a time for waiting for the first uplink data of the UE that is forwarded by the second base station to the second moment, so as to prolong a time for which the first base station waits for receiving the first uplink data forwarded by the second base station, that is, provide more time for the first base station to perform joint reception, demodulation, and decoding to improve a correctness rate of a demodulation and decoding result, so as to increase a volume of uplink data successfully transmitted by the UE within unit time, thereby improving an uplink rate of the UE.

Exemplarily, in a frequency division duplexing (Frequency Division Duplexing, FDD) system, an interval between a moment at which the first base station receives uplink data and a moment at which the first base station starts demodulation and decoding is less than 0.5 ms, and a time for demodulation and decoding is relatively long and is usually longer than 2 ms. Herein, a time interval between the second moment and the first moment may be 8 ms.

203: If the first uplink data is received between the first moment and the second moment, where the second moment is later than the first moment, the first base station performs joint demodulation and decoding of the first uplink data and the second uplink data and determines a demodulation and decoding result, or the first base station determines a demodulation and decoding result according to first data forwarded by the second base station, where the first data is data obtained after the second base station performs demodulation and decoding of the first uplink data.

The first data may include a data bit and result indication information that are obtained after the second base station performs demodulation and decoding of the first uplink data.

If the first uplink data forwarded by one second base station (or more than one second base station) is received between the first moment and the second moment, the first base station performs joint demodulation and decoding of the second uplink data received from the UE and the first uplink data forwarded by the second base station and determines a demodulation and decoding result.

There are various manners for determining whether the demodulation and decoding result is correct. For example, the first base station may compare a check code obtained after demodulation and decoding of uplink data of the UE with a check code carried in the uplink data of the UE. If the check code obtained after demodulation and decoding of the uplink data of the UE is the same as the check code carried in the uplink data of the UE, a flag bit may be set to 1, to indicate that the demodulation and decoding result is correct. If the check code obtained after performing demodulation and decoding of the uplink data of the UE is different from the check code carried in the uplink data of the UE, the flag bit may be set to 0, to indicate that the demodulation and decoding result is incorrect.

Optionally, that the first base station performs joint demodulation and decoding of the first uplink data and the second uplink data and determines a demodulation and decoding result includes: if the second base station does not perform demodulation and decoding of the first uplink data sent by the UE after receiving the uplink data, the first base station performs joint demodulation and decoding of the second uplink data received from the UE and the first uplink data forwarded by the second base station; the first base station determines that the demodulation and decoding result is correct if the demodulation and decoding is correct, or the first base station determines that the demodulation and decoding result is incorrect if the demodulation and decoding is incorrect. Alternatively, if the first base station performs joint demodulation and decoding of the second uplink data received from the UE and the first uplink data forwarded by the second base station and obtains a correct demodulation and decoding result, the first base station may update the incorrect demodulation and decoding result obtained in step 202 to the correct demodulation and decoding result, and determine that the demodulation and decoding result is correct.

Optionally, that the first base station determines a demodulation and decoding result according to first data forwarded by the second base station includes: the first base station determines that the demodulation and decoding result is correct, if the demodulation and decoding of the first uplink data performed by the second base station is correct and the result indication information indicates that the demodulation and decoding is correct; or the first base station determines that the demodulation and decoding result is incorrect, if the demodulation and decoding of the first uplink data performed by the second base station is incorrect and the result indication information indicates that the demodulation and decoding is incorrect. Alternatively, if the demodulation and decoding of the first uplink data performed by the second base station is correct, the result indication information indicates that demodulation and decoding is correct, the first base station may update the incorrect demodulation and decoding result obtained in step 202 to the correct demodulation and decoding result, and determine that the demodulation and decoding result is correct.

In this way, if the first base station determines, after the second moment, that the demodulation and decoding result is correct, the first base station sends the UL-Grant indication information to instruct the UE to perform data transmission; if the first base station determines, after the second moment, that the demodulation and decoding result is incorrect, the first base station sends the UL-Grant indication information to instruct the UE to perform data retransmission.

Herein, the determining that the demodulation and decoding result is incorrect may include: when separate demodulation and decoding of the second uplink data received by the first base station from the UE is performed at the first moment and an incorrect demodulation and decoding result is obtained, and the first uplink data forwarded by the second base station does not reach the first base station before the second moment, the first base station finally determines that the demodulation and decoding result is incorrect; or when the first uplink data forwarded by the second base station reaches the first base station before the second moment, but what is forwarded by the second base station is first data obtained after demodulation and decoding of the first uplink data, demodulation and decoding of the first uplink data performed by the second base station is incorrect, and the result indication information indicates that the demodulation and decoding is incorrect, the first base station finally determines that the demodulation and decoding result is incorrect; or when the first base station receives the first uplink data that is forwarded by the second base station and on which demodulation and decoding has not been performed, but the first base station still obtains an incorrect demodulation and decoding result after performing joint demodulation and decoding of the first uplink data received from the second base station and the second uplink data received directly from the UE, the first base station finally determines that the demodulation and decoding result is incorrect.

According to the uplink inter-cell coordination method provided in this embodiment of the present invention, a serving cell of UE belongs to a first base station, and a coordinated cell belongs to a second base station. When the first base station does not receive, before a first moment, first uplink data forwarded by the second base station, and the first base station performs demodulation and decoding of second uplink data received from the UE and obtains an incorrect demodulation and decoding result, the first base station suspends a hybrid automatic repeat request HARQ process. In this case, different from the prior art in which retransmission scheduling is immediately performed, the first base station waits to receive the first uplink data forwarded by the second base station until a second moment. Therefore, a moment for joint reception, demodulation, and decoding is postponed to the second moment in this embodiment of the present invention from the first moment in the prior art, so that when the first uplink data forwarded by the second base station does not reach the first base station in time before the first moment due to a relatively long delay in data interaction between the base stations, the first base station has more time to perform joint reception, demodulation, and decoding. Because a correctness rate of joint reception, demodulation, and decoding is higher than a correctness rate of separate demodulation and decoding by the first base station, a volume of uplink data that is successfully transmitted by the UE in unit time is increased, thereby improving an uplink rate of the UE, and resolving a problem that an uplink rate of UE is low because joint reception, demodulation, and decoding cannot be performed due to a relatively long delay in data interaction between base stations.

An uplink inter-cell coordination method in a process in which the UE sends uplink data is described in detail below with reference to a specific embodiment.

Figure 3A:
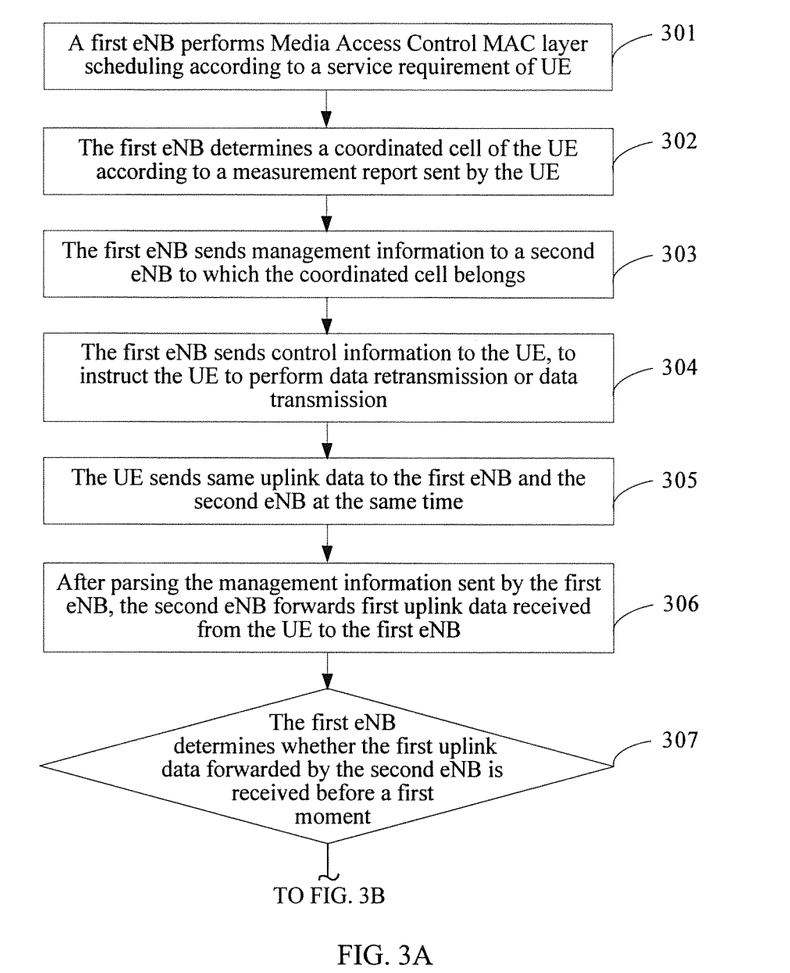
FIG. 3A and FIG. 3B are a flowchart of another uplink inter-cell coordination method according to an embodiment of the present invention.
Figure 3B:
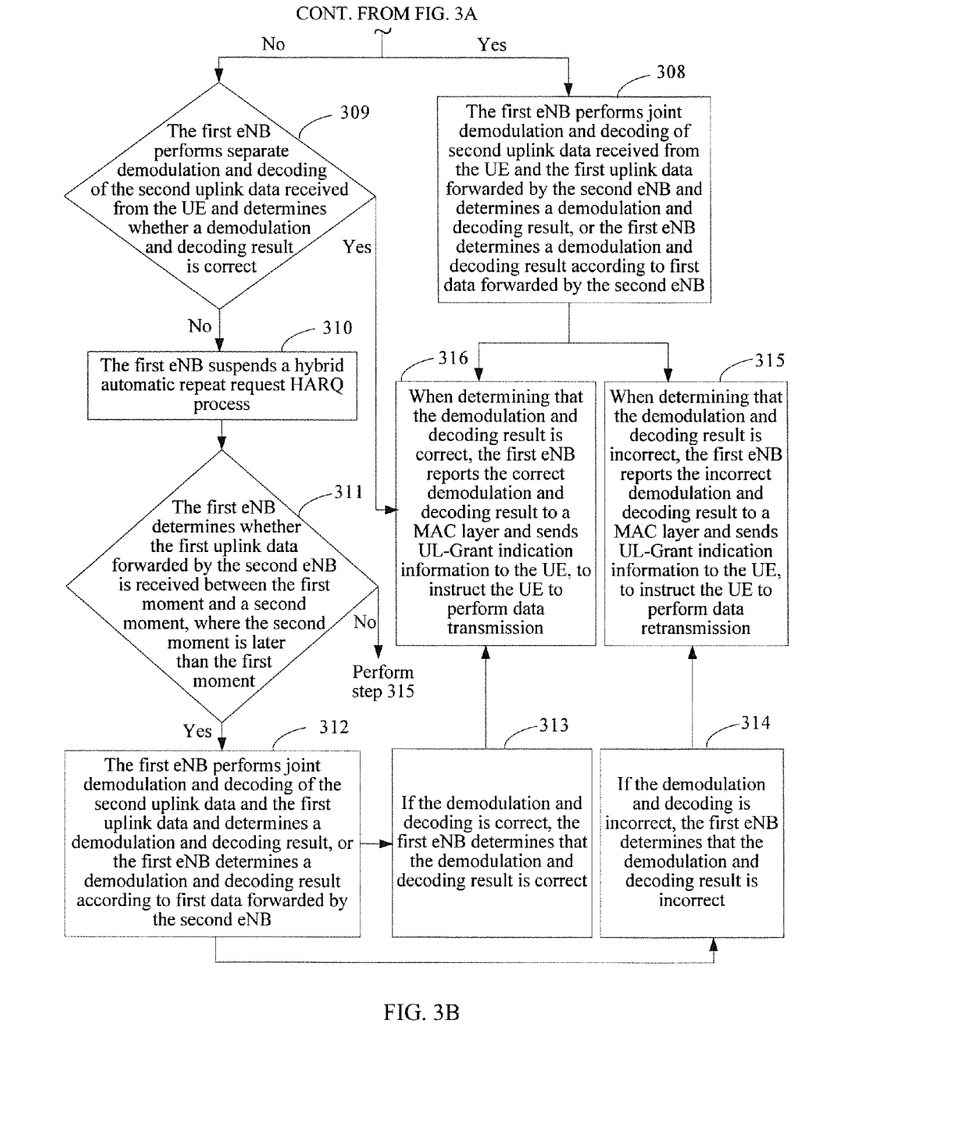

This embodiment of the present invention is described by using base stations eNBs and user equipment UE in an LTE system. A first base station eNB is a base station 0 to which a serving cell of the UE belongs, and a second base station eNB may be one or more of base stations 1 to K (K≥1) to which a coordinated cell of the UE belongs. As shown in FIG. 3A and FIG. 3B, specific steps may include:

301: The first eNB performs Media Access Control (MAC) layer scheduling according to a service requirement of the UE.

For example, the scheduling here may be allocating a resource to the UE for sending uplink data.

302: The first eNB determines a coordinated cell of the UE according to a measurement report sent by the UE.

Exemplarily, after the first eNB allocates a resource to the UE, the UE sends the measurement report to the first eNB, so that the first eNB determines a coordinated cell of the UE according to the measurement report. The measurement report may include downlink reference signal received powers (RSRP) of multiple cells, that is, carry an average value of power of signals received on all resource elements of a downlink reference signal, to indicate radio signal strength of a neighboring cell. The first eNB may select, from measured neighboring cells, a neighboring cell whose downlink RSRP meets a requirement (for example, a difference between the downlink RSRP of the neighboring cell and RSRP of the serving cell falls within a specified threshold) as a coordinated cell according to an RSRP measurement result reported by the UE.

303: The first eNB sends management information to a second eNB to which the coordinated cell belongs.

The management information may include scheduling information about connected UE in the first eNB, cell-level configuration information, and the like, so that the second eNB receives and parses the management information, and forwards uplink data received from the UE to the first eNB according to a parsing result.

304: The first eNB sends control information to the UE, to instruct the UE to perform data retransmission or data transmission.

After the first eNB determines the base station to which the coordinated cell of the UE belongs, the first eNB may send control information to the UE by using a physical downlink control channel (Physical Downlink Control Channel, PDCCH) or a PHICH. The PHICH may carry an ACK signal or an NACK signal, to instruct the UE to perform data retransmission or data transmission. The PDCCH may carry other scheduling information or control information.

305: The UE sends same uplink data to the first eNB and the second eNB at the same time.

In this step, in a process of sending uplink data, the UE may send a same piece of data to the first eNB and the second eNB in each transmission time interval (TTI), that is, the UE sends different uplink data in different TTIs.

However, to improve a transmission success rate of current data, optionally, a transmission time interval bundling TTI Bundling technology may be used to cause the UE to enter a TTI Bundling state, that is, the UE may send same data or different derived data of same data to the first eNB and the second eNB at the same time within several continuous TTIs (which may be, for example, four TTIs).

The first eNB may send a signal to the UE when establishing a connection to the UE, to instruct the UE to enter the TTI Bundling state; or may obtain transmission quality when the UE sends uplink data in a communication process after connection, and determine, according to the transmission quality, whether to send an indication signal to the UE to instruct the UE to enter the TTI Bundling state to send the uplink data. The transmission quality may include a signal-to-noise ratio SNR, a signal to interference plus noise ratio SINR, or a modulation and coding scheme MCS of the UE, or may include other parameters, which is not limited herein. Exemplarily, when voice service transmission is performed between the UE and the base station, and the SNR or the SINR of the UE is less than a particular threshold, it indicates that great noise is mixed in a voice signal and sound quality of sound playback is low. In this case, the first base station may instruct the UE to send the uplink data in the TTI Bundling state, so as to increase a volume of uplink data successfully transmitted by the UE. The MCS may indicate a data transmission rate of the UE in a current modulation, demodulation, and decoding manner. Therefore, when the transmission rate is lower than a particular threshold, an indication signal may be sent to the UE, to instruct the UE to enter the TTI Bundling state to send the uplink data.

306: After parsing the management information sent by the first eNB, the second eNB forwards first uplink data received from the UE to the first eNB.

Exemplarily, if a time taken by the second eNB to forward the first uplink data received from the UE to the first eNB is t ms, a moment at which the first eNB receives the first uplink data forwarded by the second eNB is t ms later than a moment at which the first eNB receives second uplink data directly from the UE.

In a first possible implementation manner, the second eNB may directly forward the first uplink data received from the UE to the first eNB. If the TTI Bundling technology is used, the second eNB may forward first uplink data received in each TTI to the first eNB, or may combine first uplink data received in multiple TTIs and forward the combined data. In a second possible implementation manner, the second eNB may alternatively send processed first uplink data to the first eNB. This embodiment of the present invention does not limit the specific manner in which the second eNB sends data to the first eNB.

In the second possible implementation manner, the second eNB may send, to the first eNB, first data obtained after demodulation and decoding of the first uplink data, where the first data may include a data bit, result indication information, and the like that are obtained after the second base station performs demodulation and decoding of uplink data. Reasons are that on one hand, because a data volume of the first uplink data directly forwarded by the second eNB is large and may reach the Gbps level, a relatively high bandwidth requirement is imposed on a transmission network between base stations; on the other hand, when a bandwidth capacity of the transmission network is limited, the second eNB may encounter a transmission error or cannot transmit the first uplink data to the first eNB in time, and therefore cannot perform joint demodulation in time, reducing a correctness rate of a demodulation and decoding result when the first base station performs demodulation and decoding of the uplink data of the UE, and reducing an uplink rate of the UE. Sending the first data obtained after demodulation and decoding to the first eNB, can lower the bandwidth required for the transmission network between the base stations to 1/10 to 1/8 of that before demodulation and decoding, thereby lowering the bandwidth requirement on the transmission network between the base stations.

Alternatively, in the second possible implementation manner, the second eNB may perform compression processing on the first uplink data and then forward the compressed first uplink data to the first eNB. In this way, compared with a manner in which the second eNB directly forwards the first uplink data, this manner can lower a bandwidth required for interaction between the base stations to ½ of that before compression processing.

307: The first eNB determines whether the first uplink data forwarded by the second eNB is received before a first moment; and if the first eNB determines that the first uplink data forwarded by the second eNB is received before the first moment, that is, the first eNB receives the first uplink data forwarded by the second eNB, performs step 308; or if the first eNB determines that the first uplink data forwarded by the second eNB is not received before the first moment, that is, the first eNB does not receive the first uplink data forwarded by the second eNB, performs step 309.

308: The first eNB performs joint demodulation and decoding of second uplink data received from the UE and the first uplink data forwarded by the second eNB and determines a demodulation and decoding result, or the first eNB determines a demodulation and decoding result according to first data forwarded by the second eNB; and then performs step 315 or step 316.

The first data is data obtained after the second base station performs demodulation and decoding of the first uplink data, and the first data may include a data bit and result indication information that are obtained after the second base station performs demodulation and decoding of the first uplink data.

In step 308, the first eNB may perform joint reception, demodulation, and decoding according to the second uplink data received by the first eNB directly from the UE and the first uplink data forwarded by the second eNB. If the demodulation and decoding is correct, the first base station determines that the demodulation and decoding result is correct; if the demodulation and decoding is incorrect, the first base station determines that the demodulation and decoding result is incorrect. The joint reception may be performed at a physical layer.

Alternatively, the first eNB may determine the demodulation and decoding result according to the first data forwarded by the second eNB. If the demodulation and decoding of the first uplink data performed by the second base station is correct and the result indication information indicates that the demodulation and decoding is correct, the first base station determines that the demodulation and decoding result is correct. If the demodulation and decoding of the first uplink data performed by the second base station is incorrect and the result indication information indicates that the demodulation and decoding is incorrect, the first base station determines that the demodulation and decoding result is incorrect. In this case, the first eNB needs to perform separate demodulation and decoding of the second uplink data received directly from the UE and determines whether the demodulation and decoding result is correct. Because there may be multiple second eNBs, when receiving first data forwarded by the second eNBs, the first eNB needs to perform a combining operation on demodulation and decoding results in the first data. If the first eNB determines that any one of the second eNBs obtains a correct demodulation and decoding result, the first eNB determines that the demodulation and decoding result is correct. The combining operation may not be limited to being performed at a physical layer, but may also be performed at a data link layer or another layer.

There may be various specific manners in which the first eNB determines whether the demodulation and decoding result is correct. Exemplarily, the first eNB may compare a check code obtained after demodulation and decoding of uplink data of the UE with a check code carried in the uplink data of the UE. If the check code obtained after demodulation and decoding of the uplink data of the UE is the same as the check code carried in the uplink data of the UE, a flag bit may be set to 1, to indicate that the demodulation and decoding result is correct. If the check code obtained after demodulation and decoding of the uplink data of the UE is different from the check code carried in the uplink data of the UE, the flag bit may be set to 0, to indicate that the demodulation and decoding result is incorrect.

309: The first eNB performs separate demodulation and decoding of the second uplink data received from the UE and determines whether a demodulation and decoding result is correct; and if determining that the demodulation and decoding result is correct, performs step 316; or if determining that the demodulation and decoding result is incorrect, performs step 310.

310: The first eNB suspends a hybrid automatic repeat request HARQ process.

The hybrid automatic repeat request HARQ process refers to that the first eNB performs uplink data retransmission scheduling on the UE when an incorrect demodulation and decoding result is obtained. If the demodulation and decoding result in step 309 is incorrect, the first eNB suspends the automatic repeat request HARQ process and the first eNB is prohibited from performing uplink data retransmission scheduling on the UE, so as to prolong a time for waiting for the first uplink data forwarded by the second eNB.

Exemplarily, when the first eNB performs separate demodulation and decoding of the second uplink data received from the UE and obtains an incorrect demodulation and decoding result, the first eNB does not send an NACK signal to the UE, but instead, sends an ACK signal to the UE by using an uplink control channel PHICH to notify the UE that the first eNB has received the uplink data sent by the UE and skips sending UL-Grant indication information of the HARQ process to the UE, so as to prohibit the UE from sending new uplink data. For the UE, the UE transmits new data to the base station only when the UE receives the ACK signal and the UL-Grant indication information instructing the UE to send a next piece of data, that are sent by the base station. In this embodiment, if the first eNB does not send the UL-Grant indication information of the HARQ process to the UE, the UE does not send new data to the first eNB. That is, the UE is caused not to perform data retransmission and data transmission.

311: The first eNB determines whether the first uplink data forwarded by the second eNB is received between the first moment and a second moment, where the second moment is later than the first moment; and if the first eNB determines that the first uplink data forwarded by the second eNB is received between the first moment and the second moment, that is, the first eNB receives the first uplink data, performs step 312; or if the first eNB determines that the first uplink data forwarded by the second eNB is not received between the first moment and the second moment, that is, the first eNB does not receive the first uplink data, performs step 315.

In step 311, the second moment is additionally set to determine whether to perform joint reception, demodulation, and decoding, and the second moment is later than the first moment. Compared with the prior art in which only the first moment is provided to determine whether to perform joint reception, demodulation, and decoding, when a delay in data interaction between the base stations is relatively long, the second moment that is additionally set, so that more time may be provided for the first eNB to perform joint reception, demodulation, and decoding. Because a correctness rate of joint demodulation and decoding is higher than a correctness rate of separate demodulation and decoding, demodulation and decoding performance is improved, retransmission rate of uplink data of the UE is reduced, and an uplink rate of the UE is improved. In this way, a problem that an uplink rate of UE is low because joint reception, demodulation, and decoding cannot be performed due to a relatively long delay in data interaction between base stations can be resolved.

If the TTI Bundling technology is not used, the second moment may be, for example, 10 ms later than the first moment, and may be set according to a processing capability of a base station.

If the III Bundling technology is used, because a time interval T1 (which may be, for example, 4 ms) between a moment at which the first eNB in the TTI Bundling state sends an ACK signal to the UE and a moment at which the first eNB sends UL-Grant indication information is greater than a time interval T2 (where T2 has a very small value that can almost be ignored) between a moment at which the first eNB in a non-TTI Bundling state sends an ACK signal to the UE and a moment at which the first eNB sends UL-Grant indication information, a time for which the first eNB waits for the first uplink data forwarded by the second eNB may be prolonged. Therefore, the second moment may be set in two manners: a moment A and a moment B. When the UE does not enter the TTI Bundling state to transmit uplink data, the moment A is used as the second moment; when the UE enters the TTI Bundling state to transmit uplink data, the moment B is used as the second moment. For example, the moment B may be 4 ms later than the moment A. In this way, more time can be provided for the first eNB to wait for receiving the first uplink data forwarded by the second eNB.

It should be noted that because the time interval T1 between the moment at which the first eNB in the TTI Bundling state sends the ACK signal to the UE and the moment at which the first eNB sends the UL-Grant indication information is relatively long (for example, 4 ms), the first eNB may not suspend the HARQ process, but instead, sets the second moment in the time interval T1. A time interval between the second moment and the first moment may be 4 ms or less than 4 ms. If the HARQ process is suspended in the TTI Bundling state, and the time interval T1 is added, the time interval between the second moment and the first moment may be longer and may be, for example, 12 ms.

312: The first eNB performs joint demodulation and decoding of the second uplink data and the first uplink data and determines a demodulation and decoding result, or the first eNB determines a demodulation and decoding result according to first data forwarded by the second eNB.

For a process in which the first eNB determines the demodulation and decoding result, refer to step 308.

313: If the demodulation and decoding in step 312 is correct, the first eNB determines that the demodulation and decoding result is correct, and performs step 316.

Alternatively, if the demodulation and decoding in step 312 is correct, the first eNB may update the incorrect demodulation and decoding result obtained after the demodulation and decoding at the first moment to the correct demodulation and decoding result and determine that the demodulation and decoding result is correct, and then perform step 316.

314: If the demodulation and decoding in step 312 is incorrect, the first eNB determines that the demodulation and decoding result is incorrect, and performs step 315.

315: When determining that the demodulation and decoding result is incorrect, the first eNB reports the incorrect demodulation and decoding result to a MAC layer and sends UL-Grant indication information to the UE, to instruct the UE to perform data retransmission.

316: When determining that the demodulation and decoding result is correct, the first eNB reports the correct demodulation and decoding result to a MAC layer and sends UL-Grant indication information to the UE, to instruct the UE to perform data transmission.

For a flowchart of the uplink inter-cell coordination method in a process in which the UE sends uplink data in this embodiment of the present invention, refer to FIG. 3A and FIG. 3B. For a flowchart of signaling and data interaction in the uplink inter-cell coordination method, refer to FIG. 4.

Figure 4:
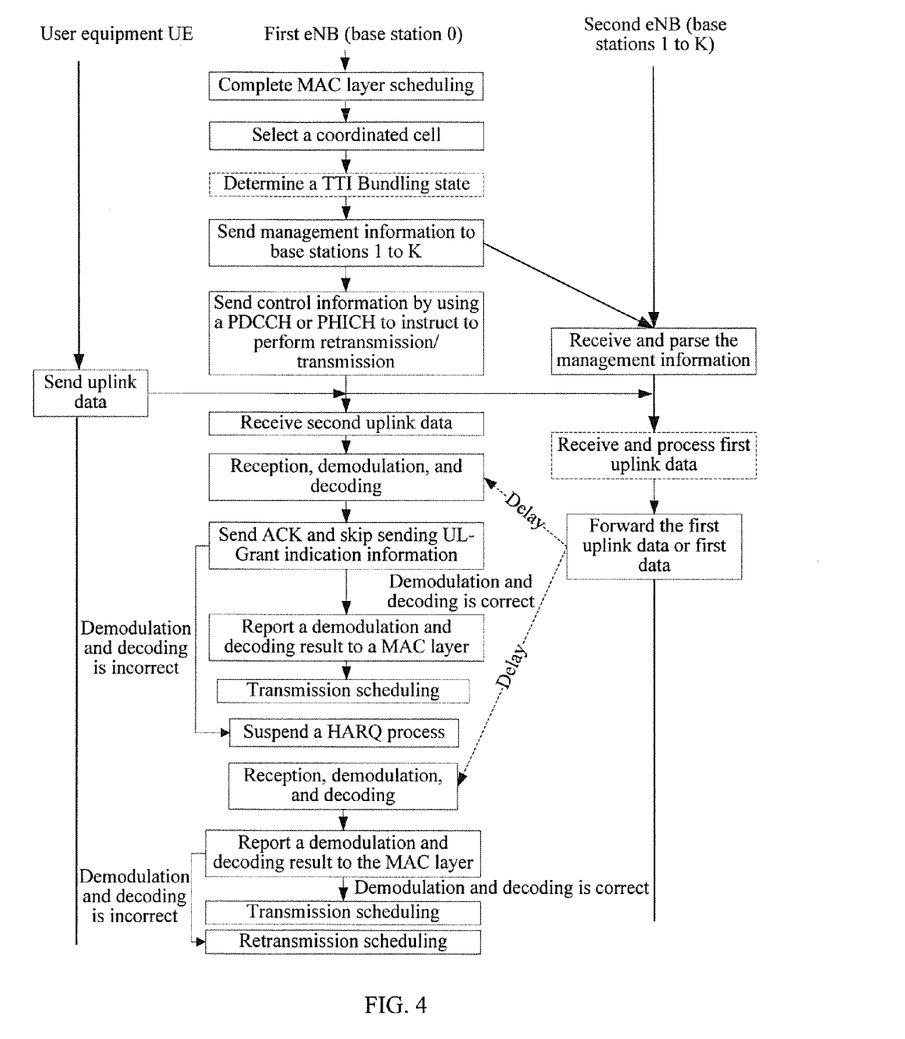
FIG. 4 is a flowchart of signaling and data interaction in an uplink inter-cell coordination method according to an embodiment of the present invention.

According to the uplink inter-cell coordination method provided in this embodiment of the present invention, when a delay in data interaction between base stations is relatively long, and a first eNB performs separate demodulation and decoding of second uplink data received from UE and obtains an incorrect demodulation and decoding result, different from the prior art in which retransmission scheduling is immediately performed, the first eNB suspends an automatic repeat request HARQ process to prohibit the UE from immediately retransmitting uplink data. In this way, when first uplink data forwarded by a second base station does not reach the first base station in time before a first moment, more time can be provided for the first eNB to continue to wait for receiving the first uplink data forwarded by the second eNB before a second moment, and then joint reception, demodulation, and decoding are performed. In addition, because a correctness rate of joint reception, demodulation, and decoding is higher than a correctness rate of separate demodulation and decoding of the first base station, a volume of uplink data that is successfully transmitted by the UE in unit time is increased, and an uplink rate of the UE is improved. When the TTI Bundling technology is used, more time can be provided before the second moment to wait for receiving the first uplink data forwarded by the second eNB, and then joint reception, demodulation, and decoding are performed. Therefore, this embodiment of the present invention can resolve a problem that an uplink rate of UE is low because joint reception, demodulation, and decoding cannot be performed due to a relatively long delay in data interaction between base stations.

Figure 5:
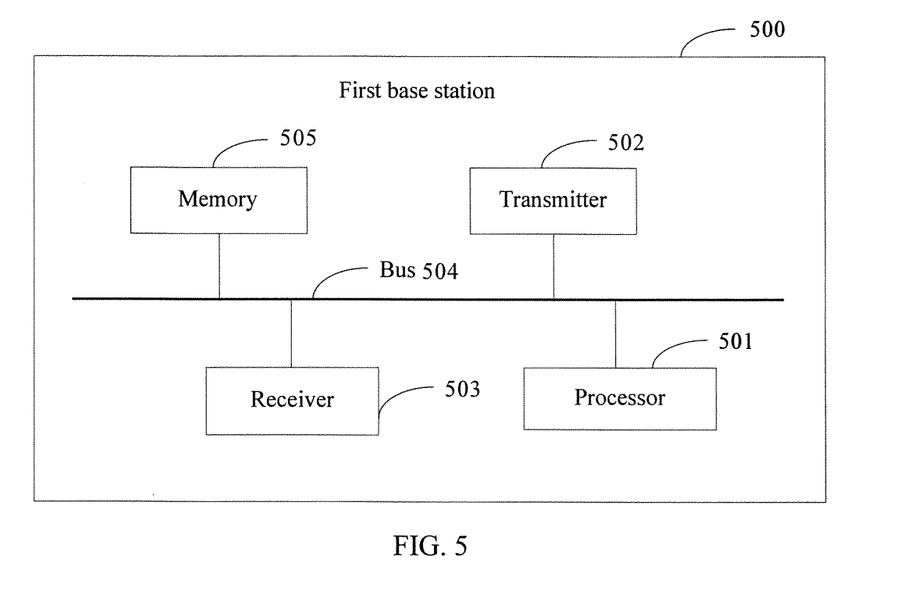
FIG. 5 is a structural diagram of another base station according to an embodiment of the present invention.

Referring to FIG. 5, an embodiment of the present invention further provides a first base station 500. The base station 500 includes: a processor 501, a transmitter 502, a receiver 503, a bus 504, and a memory 505. The memory 505 is configured to store an instruction and data. The bus 504 is configured to connect the processor 501, the transmitter 502, the receiver 503, and the memory 505. The processor 501 executes the instruction to determine whether the receiver 503 receives, before a first moment, first uplink data sent by user equipment UE and forwarded by a second base station. A serving cell of the UE belongs to the first base station 500, and a coordinated cell of the UE belongs to the second base station. If the processor 501 executes the instruction and determines that the receiver 503 does not receive the first uplink data before the first moment, the processor 501 performs demodulation and decoding of second uplink data received from the UE, and if an incorrect demodulation and decoding result is obtained, the processor 501 suspends a hybrid automatic repeat request HARQ process. The processor 501 executes the instruction to determine whether the receiver 503 receives the first uplink data forwarded by the second base station between the first moment and a second moment. If the processor 501 executes the instruction and determines that the first uplink data is received between the first moment and the second moment, where the second moment is later than the first moment, the processor 501 performs joint demodulation and decoding of the first uplink data and the second uplink data and determines a demodulation and decoding result, or determines a demodulation and decoding result according to first data forwarded by the second base station. The first data is data obtained after the second base station performs demodulation and decoding of the first uplink data.

In this embodiment of the present invention, optionally, the processor 501 executes the instruction to further obtain transmission quality when the UE sends uplink data, where the uplink data includes the first uplink data and the second uplink data, and the transmission quality includes a signal-to-noise ratio SNR, a signal to interference plus noise ratio SINR, or a modulation and coding scheme MCS of the UE.

In this embodiment of the present invention, optionally, the transmitter 502 executes the instruction to further send an indication signal to the UE according to the transmission quality obtained by the processor 501, where the indication signal is used to enable the UE to enter a transmission time interval bundling TTI Bundling state to send the uplink data.

In this embodiment of the present invention, optionally, that the transmitter 502 executes the instruction to suspend a hybrid automatic repeat request HARQ process includes: sending an acknowledgement signal ACK to the UE and skipping sending transmission indication information of the HARQ process to the UE, where the transmission indication information is used to instruct the UE to continue to send a next piece of uplink data.

In this embodiment of the present invention, optionally, that the processor 501 executes the instruction to perform joint demodulation and decoding of the first uplink data and the second uplink data and determine a demodulation and decoding result includes:
performing joint demodulation and decoding of the second uplink data received from the UE and the first uplink data forwarded by the second base station; and
determining that the demodulation and decoding result is correct if the demodulation and decoding is correct; or determining that the demodulation and decoding result is incorrect if the demodulation and decoding is incorrect.

In this embodiment of the present invention, optionally, that the processor 501 executes the instruction to determine a demodulation and decoding result according to first data forwarded by the second base station, where the first data includes a data bit and result indication information that are obtained after the second base station performs demodulation and decoding of the first uplink data, includes:
determining that the demodulation and decoding result is correct, if the demodulation and decoding of the first uplink data performed by the second base station is correct and the result indication information indicates that the demodulation and decoding is correct; or
determining that the demodulation and decoding result is incorrect, if the demodulation and decoding of the first uplink data performed by the second base station is incorrect and the result indication information indicates that the demodulation and decoding is incorrect.

In this embodiment of the present invention, optionally, the transmitter 502 executes the instruction to further send retransmission indication information to the UE if the first base station 500 determines, after the second moment, that the demodulation and decoding result is incorrect, where the retransmission indication information is used to instruct the UE to retransmit the uplink data; or send transmission indication information to the UE if the first base station 500 determines, after the second moment, that the demodulation and decoding result is correct.

According to the base station provided in this embodiment of the present invention, a serving cell of UE belongs to the first base station 500, and a coordinated cell belongs to a second base station. When the first base station 500 does not receive, before a first moment, first uplink data forwarded by the second base station, and the first base station 500 performs demodulation and decoding of second uplink data received from the UE and obtains an incorrect demodulation and decoding result, the first base station 500 suspends a hybrid automatic repeat request HARQ process. In this case, different from the prior art in which retransmission scheduling is immediately performed, the first base station 500 waits to receive the first uplink data forwarded by the second base station until a second moment. Therefore, a moment for joint reception, demodulation, and decoding is postponed to the second moment in this embodiment of the present invention from the first moment in the prior art, so that when the first uplink data forwarded by the second base station does not reach the first base station 500 in time before the first moment due to a relatively long delay in data interaction between the base stations, the first base station 500 has more time to perform joint reception, demodulation, and decoding. Because a correctness rate of joint reception, demodulation, and decoding is higher than a correctness rate of separate demodulation and decoding by the first base station 500, a volume of uplink data that is successfully transmitted by the UE in unit time is increased, thereby improving an uplink rate of the UE, and resolving a problem that an uplink rate of UE is low because joint reception, demodulation, and decoding cannot be performed due to a relatively long delay in data interaction between base stations.

In the several embodiments provided in the present application, it should be understood that the disclosed base station and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

In addition, functional units in the device and system in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

All or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a USB flash drive, a removable hard disk, a read-only memory (Read-Only Memory, ROM for short), a random access memory (Random Access Memory, RAM for short), a magnetic disc, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A base station, comprising a non-transitory computer-readable medium coupled to the at least one processor and storing programming instructions for execution by the at least one processor, the programming instructions, when executed, instruct the processor to:
   determine whether first uplink data sent by user equipment (UE) and forwarded by a second base station is received before a first moment, wherein a serving cell of the UE belongs to the first base station, and a coordinated cell of the UE belongs to the second base station;
   perform demodulation and decoding of second uplink data received from the UE if the first uplink data is not received before the first moment, and suspend a hybrid automatic repeat request (HARQ) process if an incorrect demodulation and decoding result is obtained;
   determine whether the first uplink data forwarded by the second base station is received between the first moment and a second moment; and
   if the first uplink data is received between the first moment and the second moment, wherein the second moment is later than the first moment, perform joint demodulation and decoding of the first uplink data and the second uplink data and determine a demodulation and decoding result, or determine a demodulation and decoding result according to first data forwarded by the second base station, wherein the first data is data obtained after the second base station performs demodulation and decoding of the first uplink data.

2. The base station according to claim 1, further comprising a transceiver configured to:
   obtain transmission quality when the UE sends uplink data, wherein the uplink data comprises the first uplink data and the second uplink data, and the transmission quality comprises a signal-to-noise ratio (SNR), a signal to interference plus noise ratio (SINR), or a modulation and coding scheme (MCS) of the UE; and
   send an indication signal to the UE according to the transmission quality obtained by the transceiver, wherein the indication signal is used to instruct the UE to enter a transmission time interval bundling (TTI Bundling) state to send the uplink data.

3. The base station according to claim 1, wherein the at least one processor is configured to:
   send an acknowledgement signal (ACK) to the UE and skip sending transmission indication information of the HARQ process to the UE, wherein the transmission indication information is used to instruct the UE to continue to send a next piece of uplink data.

4. The base station according to claim 1, wherein the at least one processor is configured to:
   perform joint demodulation and decoding of the second uplink data received from the UE and the first uplink data forwarded by the second base station; and
   determine that the demodulation and decoding result is correct if the demodulation and decoding is correct, or determine that the demodulation and decoding result is incorrect if the demodulation and decoding is incorrect.

5. The base station according to claim 1, wherein:
   the first data comprises a data bit and result indication information that are obtained after the second base station performs demodulation and decoding of the first uplink data; and
   the at least one processor is configured to:
      determine that the demodulation and decoding result is correct, if the demodulation and decoding of the first uplink data performed by the second base station is correct and the result indication information indicates that the demodulation and decoding is correct, or
      determine that the demodulation and decoding result is incorrect, if the demodulation and decoding of the first uplink data performed by the second base station is incorrect and the result indication information indicates that the demodulation and decoding is incorrect.

6. The base station according to claim 1, further comprising a transceiver configured to:
   send retransmission indication information to the UE if the first base station determines, after the second moment, that the demodulation and decoding result is incorrect, wherein the retransmission indication information is used to instruct the UE to retransmit the uplink data; or
   send the transmission indication information to the UE if the first base station determines, after the second moment, that the demodulation and decoding result is correct.

7. An uplink inter-cell coordination method, comprising:
   determining, by a first base station, whether first uplink data sent by user equipment (UE) and forwarded by a second base station is received before a first moment, wherein a serving cell of the UE belongs to the first base station, and a coordinated cell of the UE belongs to the second base station;
   performing, by the first base station, demodulation and decoding of second uplink data received from the UE if the first base station determines that the first uplink data is not received before the first moment, and suspending, by the first base station, a hybrid automatic repeat request (HARQ) process if an incorrect demodulation and decoding result is obtained, and determining whether the first uplink data forwarded by the second base station is received between the first moment and a second moment; and
   if the first uplink data is received between the first moment and the second moment, wherein the second moment is later than the first moment, performing by the first base station, joint demodulation and decoding of the first uplink data and the second uplink data and determining a demodulation and decoding result, or determining, by the first base station, a demodulation and decoding result according to first data forwarded by the second base station, wherein the first data is data obtained after the second base station performs demodulation and decoding of the first uplink data.

8. The method according to claim 7, further comprising:
obtaining, by the first base station, transmission quality when the UE sends uplink data, wherein the uplink data comprises the first uplink data and the second uplink data, and the transmission quality comprises a signal-to-noise ratio (SNR), a signal to interference plus noise ratio (SINR), or a modulation and coding scheme (MCS) of the UE; and
sending, by the first base station, an indication signal to the UE according to the transmission quality, wherein the indication signal is used to instruct the UE to enter a transmission time interval bundling (TTI Bundling) state to send the uplink data.

9. The method according to claim 7, wherein suspending, by the first base station, a hybrid automatic repeat request (HARQ) process comprises:
sending, by the first base station, an acknowledgement signal (ACK) to the UE and skipping sending transmission indication information of the HARQ process to the UE, wherein the transmission indication information is used to instruct the UE to continue to send a next piece of uplink data.

10. The method according to claim 7, wherein performing, by the first base station, joint demodulation and decoding of the first uplink data and the second uplink data and determining a demodulation and decoding result comprises:
performing, by the first base station, joint demodulation and decoding of the second uplink data received from the UE and the first uplink data forwarded by the second base station; and
determining, by the first base station, that the demodulation and decoding result is correct if the demodulation and decoding is correct; or determining, by the first base station, that the demodulation and decoding result is incorrect if the demodulation and decoding is incorrect.

11. The method according to claim 7, wherein:
the first data comprises a data bit and result indication information that are obtained after the second base station performs demodulation and decoding of the first uplink data; and
determining, by the first base station, a demodulation and decoding result according to first data forwarded by the second base station comprises:
determining, by the first base station, that the demodulation and decoding result is correct, if the demodulation and decoding of the first uplink data performed by the second base station is correct and the result indication information indicates that the demodulation and decoding is correct, or
determining, by the first base station, that the demodulation and decoding result is incorrect, if the demodulation and decoding of the first uplink data performed by the second base station is incorrect and the result indication information indicates that the demodulation and decoding is incorrect.

12. The method according to claim 7, further comprising:
sending, by the first base station, retransmission indication information to the UE if the first base station determines, after the second moment, that the demodulation and decoding result is incorrect, wherein the retransmission indication information is used to instruct the UE to retransmit the uplink data; or
sending, by the first base station, the transmission indication information to the UE if the first base station determines, after the second moment, that the demodulation and decoding result is correct.

* * * * *